FIP8212 OR 3,705,987

250/201

Dec. 12, 1972 D. S. CLARKE ET AL 3,705,987

OPERATING DIFFERENTIAL EXTENDER FOR PHOTOELECTRIC EYE OR EQUIVALENT SENSING DEVICE

Filed Oct. 7, 1971 4 Sheets-Sheet 1

DUDLEY S. CLARKE
JACK CAMERA
INVENTORS by Edward J. Jarow
ATTORNEY 3,705,987

OPERATING DIFFERENTIAL EXTENDER FOR PHOTOELECTRIC EYE OR EQUIVALENT SENSING DEVICE

Dudley S. Clarke, Westchester, and Jack Camera, Chicago, Ill., assignors to Autoquip Corporation, Chicago, Ill.

Filed Oct. 7, 1971, Ser. No. 187,243
Int. Cl. G01j *1/20*; G05b *1/06*; H01j *39/12*
U.S. Cl. 250—201 6 Claims

ABSTRACT OF THE DISCLOSURE

Where one component is to be oriented with respect to another component in a direction transverse to a line extending between the components, a light beam is established between the components along that line. This light beam extends from a light source to a photoelectric eye. When the light beam is broken (or established), as a result of the components being mispositioned, a motor is energized to cause movement in a direction to reestablish (or break) the light beam. To obtain a differential between the relative position of the components when the light beam is broken (or established) as compared to when it is established (or broken) a shutter is used to cut off a side of the beam which side is oriented in the direction of movement with respect to the remainder of the beam. By masking off a side of the light beam as the components are drifting out of orientation with respect to each other and by removing the mask when a corrective movement is undertaken, the differential is achieved. In other embodiments the beam is unmasked at the time of drifting out of orientation occurs and partially masked during the period of corrective movement.

BACKGROUND AND SUMMARY OF THE INVENTION

There are numerous instances in machinery applications in which it is desired to have a movable component maintain a particular relative position with respect to another component (movable or fixed). One common procedure for doing this is to utilize a light beam and, when the parts are in the desired position, to have the light beam in one sense (established or broken) and when the desired position is not present to have the light beam in the other sense (broken or established).

Standard photocontrols normally have a great margin of sensitivity to provide protection against deteriorated operating conditions, such as, for example, low voltage, reduced light transmission resulting from such items as dust on the lenses and smoke in the optical path, etc. For example, in a system in which the light beam is one inch in diameter, a mispositioning of the ends of the optical path by perhaps as much as seven-eights of an inch can occur with the photocell still being sufficiently illuminated to act in the manner it does when it senses light.

This is advantageous in many applications. For example, assume that corrective action is to ocur between two components upon a relatively slight deviation of one component from its desired position with respect to the other component. If only one-eighth of the diameter of the beam is actually extending between the component and there is then a mispositioning such as to cut off that last one-eighth of the diameter, corrective action will be called for. As soon as the corrective action reestablishes the one-eighth of the diameter of the beam, the corrective action will be terminated. Thus with a relatively small margin of error the position of one component is established with respect to the position of the other component However, there are times when such operation is undesirable. It may require many instances of corrective action, which instances of corrective action are of short duration but closely spaced to each other. If this were in a system where a larger margin of error could be tolerated, it would be desirable to take corrective action much less frequently but to make a larger correction each time so that it would be a longer time before the next corrective action would be required. To put it another way, a "differential" often is desired between the relative position of the parts upon corrective action being called for and the relative position of the parts when corrective action is terminated. There are various ways in which this could be accomplished. For example, there could be a time lag built into the system which would normally result in over correction. This would be particularly undesirable in an application in which the corrective action did not always proceed at the same rate.

The principal object of the present invention is to provide a method and apparatus for inserting such a differential into a photoelectric control system with the differential being based directly upon the physical dimension (e.g. inches) of the amount of correction that occurs before the corrective action is terminated.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

Figure 1:
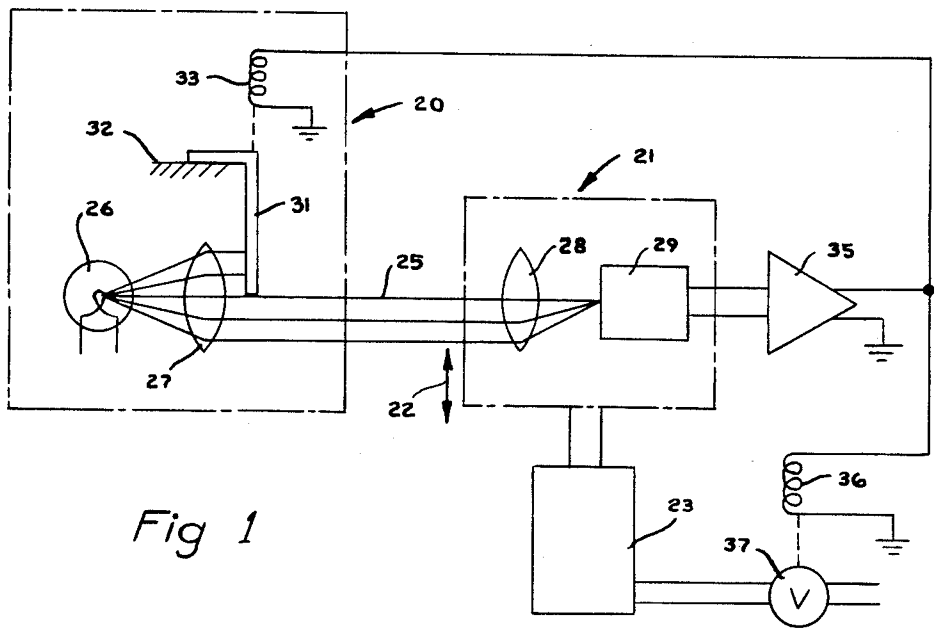
FIG. 1 is a schematic diagram of an embodiment of the invention.

In the embodiment of FIG. 1 there are two components 20 and 21. One of these components, namely component 21, is movable in a direction as indicated by arrows 22 with respect to the other component 20. This movement is under the control of a hydraulic cylinder 23 whose piston rod is connected to component 21.

A light beam 25 is established between the two components. This light beam originates at a source, e.g. light bulb 26, and is columnated by a lens 27. A component 21 the beam is intercepted by a lens 28 and focused on a photoelectric cell 29. The line of the light beam 25 is at right angles to the direction of movement 22. A shutter or beam blanking device 31 is mounted for movement between a first position (illustrated) at which it intercepts approximately half of the light beam 25 and a second position at which it is clear of the light beam 25 so that all of that beam is transmitted to lens 28. For the purposes of illustration, the shutter is urged to the first position by the pull of gravity acting on the weight of the shutter and at the first position it abuts a stop 32. The shutter is operatively connected to a solenoid 33 so that when the solenoid is energized the shutter is moved to the second position and is clear of the beam 25.

The output of the photocell 29 goes to an amplifier 35. The amplifier is connected to energize solenoid 33 as well as a solenoid 36 which opens a control valve 37 to admit hydraulic fluid to the cylinder 23. The arrangement is such that so long as no light from source 26 reaches photocell 29 the solenoids 33 and 36 will be deenergized However, if light from source 26 reaches photocell 29 the solenoids 33 and 36 will be energized. This will open valve 37 and actuate hydraulic cylinder 23 so as to move component 21 (in a corrective direction) to an extent such that no light is getting through.

The operation of the apparatus of FIG. 1 is illustrated in connection with FIGS. 2–6 wherein the double circle 28, 29 represents a view looking at lens 28 and showing the amount of that lens that is illuminated by the light beam 25 from source 26. To the extent that the light beam 25 is not blocked by mask 31 it is shown at a clear area encompassed by a phantom line in FIGS. 2–6, but to the extent that it is blocked off the blocked off area is shown clear but encompassed by a dotted line and referenced with the designation **25*a***.

Figures 2, 3, 4, 5, 6:
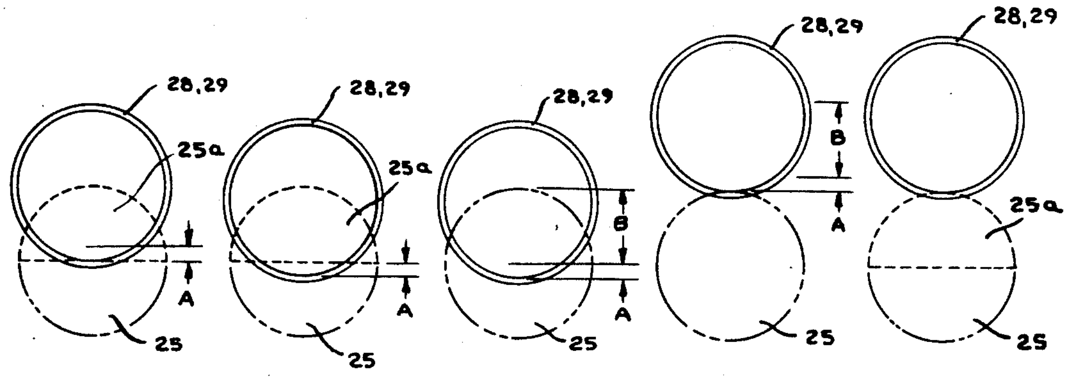
FIGS. 2 through 6 are sequential views of the light beam falling on the photoelectric cell and illustrating the sequence of operation of the embodiment of FIG. 1.

Looking at FIG. 2, if the illuminated area 25 does not impinge on lens 28 (or impinges only to a minimal amount) the photocell 29 is not actuated. However, when the illuminated area 25 moves onto lens 28 a certain minimum distance (designated A in FIGS. 2–5) there is now sufficient light at photocell 29 to produce a signal which when amplified through amplifier 35 will energize solenoids 33 and 36. FIG. 3 illustrates this condition. As already mentioned, the energizing of solenoid 36 will open valve 37. Also, the energizing of solenoid 33 will lift mask 31 so that it no longer shades any part of the beam 25. This change is illustrated in FIG. 4 (as compared to FIG. 3) where the beam now is larger in the vertical direction by a distance B. This means that now in order to turn off the photocell 29 the component 21 must be moved a distance in relation to component 20, which distance is the sum A + B. The situation after this movement has occurred is illustrated in FIG. 5. The light beam 25 now has been moved off of lens 28 to an extent such that insufficient light is now being received by photocell 29 to maintain the required output signal. As a result, solenoids 33 and 36 are deenergized. The deenergizing of solenoid 36 allows valve 37 to close. This stops the relative movement of component 21 with respect to component 20. The deenergizing of solenoid 33 allows mask 31 to drop against stop 32 under the urging of gravity. This then shades the top half of the beam to produce the area **25*a***. The situation now is that illustrated in FIG. 6. Thus while it took only a relative movement of the dimension A to turn the photocell on, the differential B was added thereto so that a relative movement of $A+B$ was required to turn the photocell off.

Figure 7:
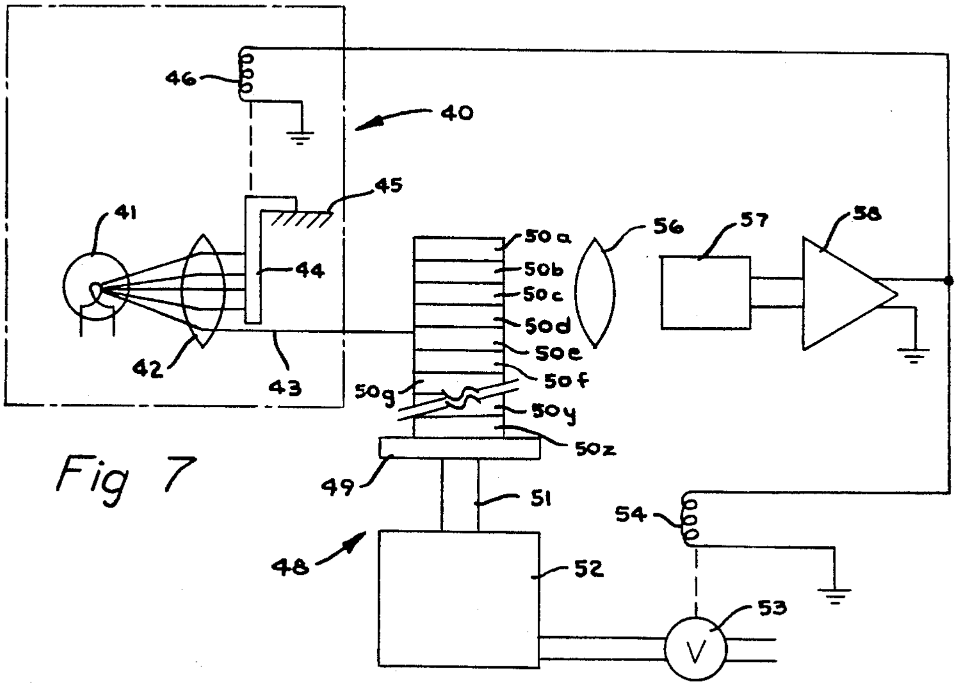
FIG. 7 is a schematic diagram of another embodiment.

FIG. 7 illustrates a first component, generally 40 which, for purposes of illustration, is assumed to be fixed. It includes a light bulb 41 as a source of light. The light is columnated by a lens 42 and produces a beam 43. An L-shaped shutter 44 rests against a fixed stop 45. The shutter is operatively connected to a solenoid 46 and raised by the solenoid when it is energized.

A second component, generally 48, comprises a vertically movable table 49 on which are a plurality of workpieces 50. For sake of illustration, these workpieces may be assumed to be discs of iron which are going to be machined in an automatic lathe. The table 49 is mounted on the piston rod 51 of a hydraulic cylinder 52. The raising of the table and piston rod is accomplished by applying hydraulic fluid to cylinder 52 through a valve 53. Valve 53 is opened when solenoid 54 is energized. A lens 56 is positioned to receive beam 43 when the beam is not otherwise blocked and to direct the beam onto a photocell 57. Photocell 57, in response to the beam, produces an output signal which through amplifier 58 energizes solenoids 46 and 54.

Figure 8:
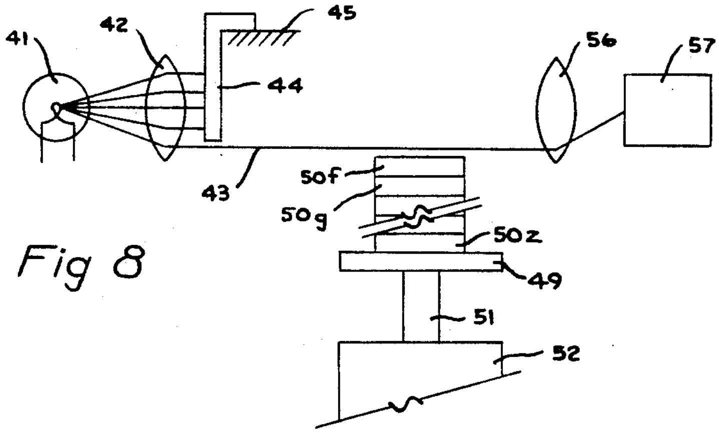
FIGS. 8–10 are schematic diagrams illustrating successive stages in the sequence of operation of the embodiment of FIG. 7.
Figure 9:
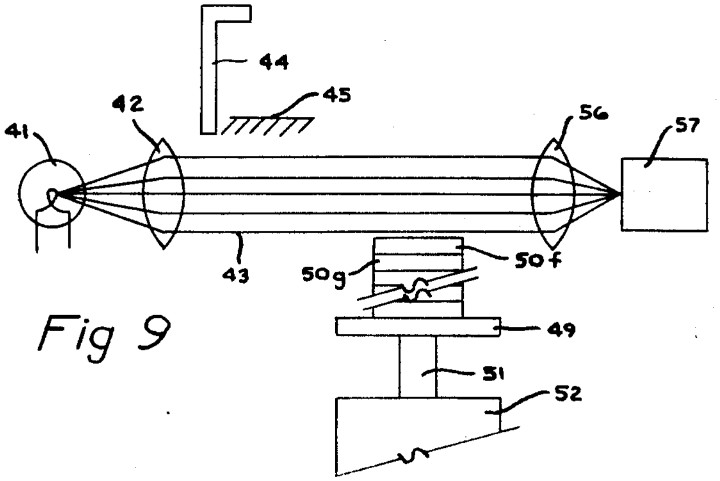
Figure 10:
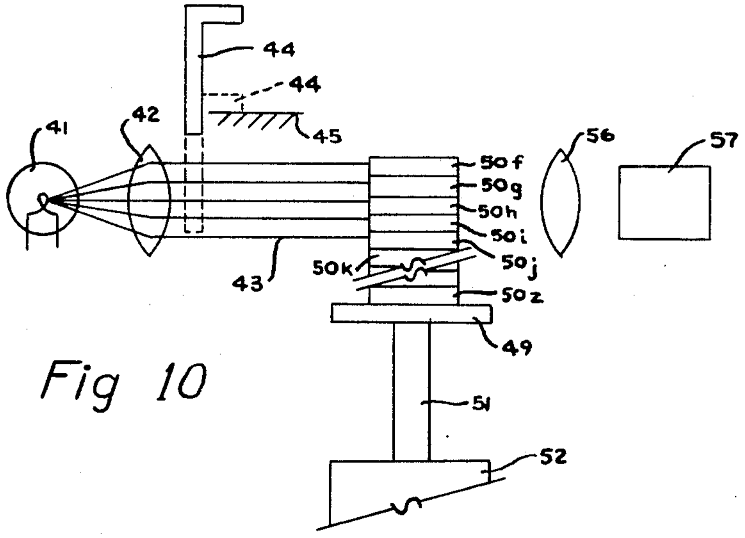

There is an automatic conveyor (not shown) which removes the workpieces 50 one at a time from the top of the stack and delivers them in sequential order to the automatic lathe to be machined. This automatic conveyor will operate only within a given range of height and periodically the stack of workpieces 50 must be raised so as to keep the top of the workpieces within the desired range. So long as beam 43 is intercepted by shutter 44 and/or the workpieces 50 no light gets to photocell 57 and there is no signal to amplifier 58 nor to solenoids 46 and 54. However, when the top workpieces **50*a* through 50*e* have been removed, a small amount of the light beam 43 is permitted to pass to lens 56 and thus to photocell 57. This small amount of the light beam is sufficient to produce a signal at photocell 57. The situation at this time is illustrated in FIG. 8. The signal at photocell 57 energizes solenoids 46 and 54. Solenoid 46 raises shutter 44 to the position illustrated in FIG. 9 so that the full beam 43 is permitted to go to the lens 56 and photocell 57. The energizing of solenoid 54 opens valve 53 to commence the raising of piston rod 51 and table 49. This raising continues until the light beam 43 is completely blocked again, as illustrated in FIG. 10. With no light now getting to lens 56 and photocell 57, the solenoids 46 and 54 are deenergized. Solenoid 46 releases shutter 44 to return to the dotted line position illustrated in FIG. 10. Deenergizing solenoid 54 permits valve 53 to close to stop the upward movement of table 49. The situation now has returned to that illustrated in FIG. 7. Thus it took only a small increment (the removal of workpiece 50*e* from the stack in FIG. 7) to initiate the upward movement of the stack. However, a differential was then added so that it took a substantially greater upward movement of the stack before tha photocell 57** was blocked off and the termination of the upward movement resulted.

Figures 11, 12:
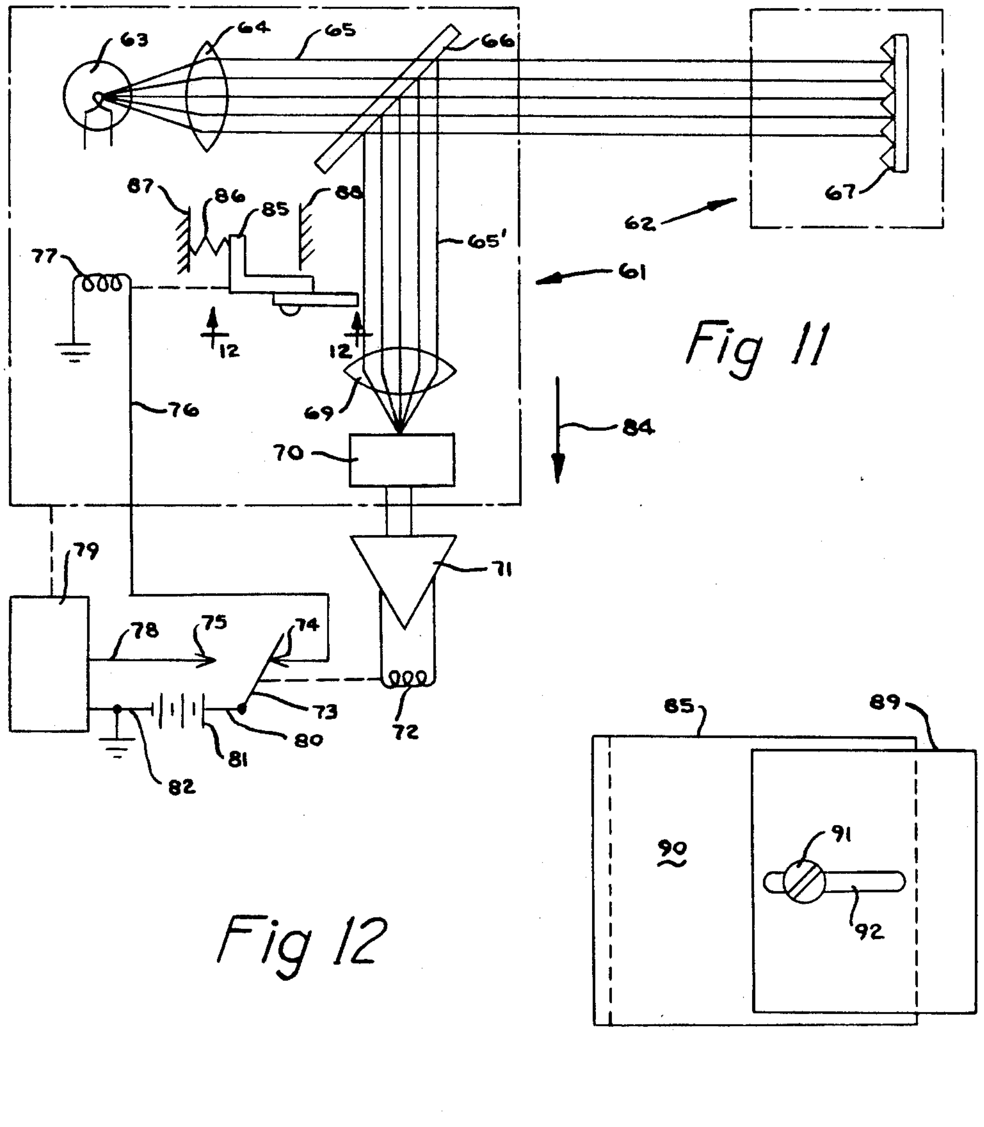
FIG. 11 is a schematic diagram of a further embodiment of the invention.
FIG. 12 is a partial view as seen at line 12—12 of FIG. 11.

Referring to FIG. 11, there is a component, generally 61, which is movable with respect to a component, generally 62. The component 61 has a light source 63 whose light is columnated by a lens 64 to produce a beam 65. This beam passes through a partially reflective—partially transmissive mirror 66. From there the beam goes to a reflector 67 on component 62. The reflector is of a character to return the beam along its path of incidence so that the beam returns on itself to mirror 66. At mirror 66 the beam is turned at right angles and produces a beam 65'. The returning beam 65' is focused on a photocell 70 by a lens 69. The photocell thus produces an electrical signal which after being amplified by an amplifier 71 energizes the solenoid 72 of a relay having a blade 73 and two contacts 74 and 75. Wire 76 connects contact 74 to a solenoid 77. The other side of the solenoid 77 is connected to ground. A wire 78 connects contact 75 with a power means 79 for moving components 61. A wire 80 connects switch blade 73 with a source of power, as indicated by battery 81. Wire 82 connects battery 81 to power means 79 and to ground. Power means 79 is operatively connected to component 61 so as to move the component in a vertical direction, as indicated by arrow 84.

An L-shaped shutter 85 is urged to the right by a compression spring 86 bearing against an abutment 87. The shutter is urged toward a second abutment 88 which serves as a stop. The shutter is operatively connected to solenoid 77 to be moved away from abutment 88 when solenoid 77 is energized. As illustrated in FIG. 12, the shutter has a supplemental blade 89 connected to the main body 90 of the shutter 85. A screw 91 extends through a slot 92 in blade 89 and is threaded into the main body 90.

Figure 13:
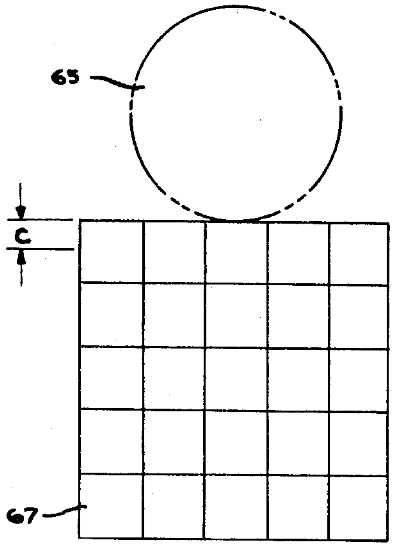
FIGS. 13–16 are sequential views showing the beam falling on the reflector and illustrate various stages of the operation of the embodiment of FIG. 11.
Figure 14:
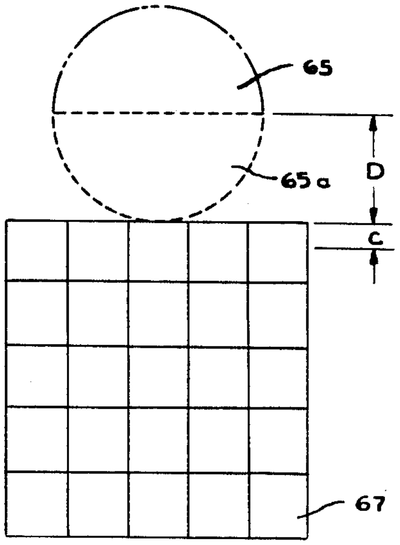
Figure 15:
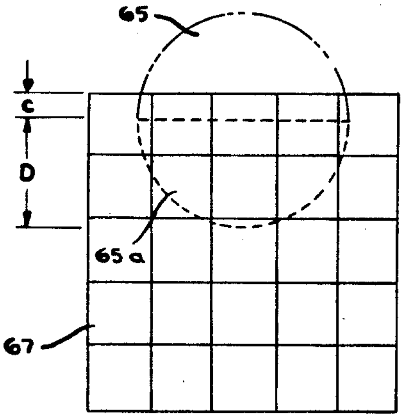
Figure 16:
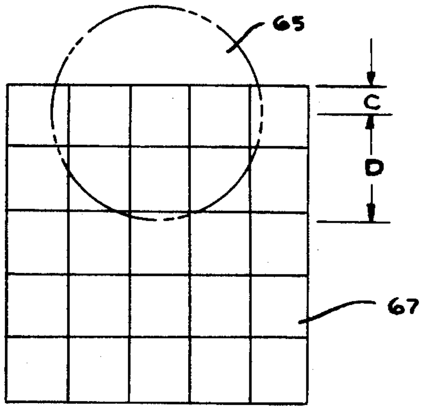

With light shining on photocell 70, a signal is produced which energizes relay solenoid 72 to hold the blade 73 against contact 74. This energizes solenoid 77 through battery 81. Solenoid 77 holds shutter 85 in the position illustrated in FIG. 11, in which position the shutter is not blocking any of the returning light beam 65'. Assume now that component 62 drifts downwardly with respect to component 61. The result will be that upon the occurrence of some final finite movement (illustrated by the dimension C in FIG. 13) the light beam 65 moves off of reflector 67 so that there is insufficient light returning to photocell 70 to produce an output signal from the photocell. Now, with relay photocell 72 no longer energized, the blade 73 moves from contact 74 to contact 75. This deenergizes solenoid 77 and spring 86 moves the shutter 85 against stop 88. The effect of this is to block off the lower side of beam 65. Actually, it blocks off the left (in FIG. 11) side of returning beam 65', but the effect is the same to produce a blank **65*a* in what would be the returning beam. Upon reaching contact 75 blade 73 creates a circuit through power means 79 to cause the power means to lower the component 61 to seek to restore the orientation between the two components. However, because of the blank 65*a* in the returning beam the component 61 must move a dimension of D in addition to the initial dimension C to energize the photocell 70. The situation at the completion of the movement $C+D$ is illustrated in FIG. 15. Now there is sufficient light striking photocell 70 to energize relay coil 72 and return the blade 73 to the position illustrated in FIG. 11. Power means 79 is thus shut off and solenoid 77 energized to withdraw shutter 85** from the path of the returning beam. The situation is now that iluustrated in FIG. 16. It took only a movement of C to turn off the photocell, but a differential D then was added so that a corrective movement of $C+D$ was required.

By moving blade 89 with respect to the main part 90 of the shutter 85, the extent to which the shutter extends into the light path may be adjusted as desired. This adjustment will change the size of dimension D and thus the extent of the differential between the amount of movement necessary to deactuate the photocell and the amount of movement required to energize the photocell.

We claim:

1. In an apparatus comprising two components wherein one component is movable with respect to the other in a direction transverse to a line extending between the two components, power means connected to said one component for moving said one component with respect to the other, said power means having an active sense in which it seeks to bring said one component into a predetermined position with respect to the other component and having a passive sense, and control means connected to said power means for actuating the power means in response to the relative position in said direction of said one component with respect to the other, said control means including a light beam extending between said components along said line from a light source to a photoelectric receiver, said light beam being established or broken depending upon said relative position of the components in said direction, when the beam is established said control means actuating said power means in one sense and when the beam is broken said control means actuating said power means in the other sense, the improvement comprising:

differential means for effecting a differential between the relative position of the components when the light beam is established as compared to the relative position of the components when the light beam is broken, said differential means comprising a beam blanking device to cut off a first part of said beam while leaving a second part of said beam, one of said parts being positioned in said direction with respect to the other of said parts, said blanking device having two states with said first part of the beam being established when the blanking device is in the first state and with said first part of the beam being cut off when the blanking device is in the second state, said blanking device being connected to said control means to set the blanking device in one state when said beam is established and to set the blanking device in the other state when said beam is broken.

2. In an apparatus as set forth in claim 1, wherein said blanking device is a shutter movable transversely of the beam between a position at which it obstructs said first part of the beam and a position at which it is clear of the beam.

3. In an apparatus as set forth in claim 2, wherein said shutter is resiliently urged to one of said positions and including a solenoid connected to the shutter for moving the shutter to the other of the positions against said urging.

4. In an apparatus as set forth in claim 1, wherein said one state corresponds to the first state and said other state corresponds to the second state.

5. In an apparatus as set forth in claim 1, wherein said one state corresponds to the second state and said other state corresponds to the first state.

6. In the method of orienting one component with respect to another component in a direction transverse to a line extending between the two components wherein a light beam is directed along the line from one component to the other component and the orientation performed depending upon whether or not the light beam was established or broken, the improvement comprising the step of establishing a differential between the relative position of the components when the light beam is established as compared to the relative position of the components when the light beam is broken, said step including masking off a side of the light beam upon the occurrence of one of acts of establishment and breaking the beam, said side being in said direction from the remaining side, and removing said masking upon the occurrence of the other of the acts of establishment and breaking the beam.

References Cited

UNITED STATES PATENTS 2,295,960 9/1942 Moore ............ 318—640 X

JAMES W. LAWRENCE, Primary Examiner

T. N. GRIGSBY, Assistant Examiner

U.S. Cl. X.R.

250—206; 318—640